United States Patent [19]

Hosler

[11] Patent Number: 4,505,974
[45] Date of Patent: Mar. 19, 1985

[54] DECORATIVE LAMINATE HAVING MAR-RESISTANT SURFACE

[75] Inventor: John F. Hosler, Cincinnati, Ohio

[73] Assignee: Formica Corporation, Wayne, N.J.

[21] Appl. No.: 538,626

[22] Filed: Oct. 3, 1983

[51] Int. Cl.³ ............................................. B32B 3/00
[52] U.S. Cl. ................................ 428/329; 156/272.2; 156/307.4; 428/331; 428/530
[58] Field of Search .............. 428/141, 323, 329, 331, 428/530; 156/272, 307.4

[56] References Cited

U.S. PATENT DOCUMENTS

| | | | |
|---|---|---|---|
| 3,373,070 | 12/1968 | Fuerst | 428/530 |
| 3,525,664 | 8/1970 | Hale et al. | 428/331 |
| 3,798,111 | 3/1974 | Lane et al. | 428/331 |
| 4,395,452 | 7/1983 | Scher et al. | 428/331 |

*Primary Examiner*—Paul J. Thibodeau
*Attorney, Agent, or Firm*—Frank M. Van Riet

[57] ABSTRACT

Decorative laminates and a method for their production are disclosed, the laminates having dispersed in their uppermost surface hard mineral particles whereby mar-resistance is imparted to the laminate.

20 Claims, No Drawings

DECORATIVE LAMINATE HAVING MAR-RESISTANT SURFACE

BACKGROUND OF THE INVENTION

For many years, decorative laminates have been used as a surfacing material in residential and commercial applications. Typical applications are surfacing for walls, partitions, table tops, counter tops, furniture, doors and the like. Decorative laminates of this type are usually produced by high pressure or low pressure methods depending upon the ultimate usage contemplated, the laminates produced utilizing high pressure techniques usually exhibiting superior properties.

High pressure decorative laminates are made of three essential layers: a core layer, a print layer, and an optional surface layer. The core layer constitutes a bottom or supporting layer onto which the other layers are bonded. In normal high-pressure laminate manufacture the core layer consists of a plurality of resin impregnated kraft paper sheets. Laminating resins commonly used include phenolic, amino, epoxy, polyester resins and the like. The industrially preferred laminating resin for decorative laminates is a phenolic resin. In low-pressure laminate manufacture, the core layer is generally comprised of a sheet of particleboard ranging from $\frac{3}{8}''$ to $1''$ in thickness.

Placed above the core layer is the print layer which is generally an alpha cellulose containing pigmented paper carrying a print, pattern, or design that has been impregnated with a melamine-formaldehyde resin.

The cured melamine-formaldehyde resins are colorless, resistant to light, solvents and stains and their heat resistance makes them immune to burning cigarettes, boiling water and heated containers up to about 325° F.

The surface layer, or overlay, is a high-quality alpha cellulose containing paper impregnated with a melamine-formaldehyde resin. This layer is optional and protects the print sheet from external abuse such as abrasive wear and tear, harsh chemicals, burns, spills and the like. It is primarily the melamine-formaldehyde resin which accounts for these protective properties.

The core marterial, print layer and optional surface layer are stacked in a superimposed relationship, between stainless steel plates and subjected to a pressure and temperature for a time sufficiently long enough to cure the laminating resins impregnating the respective layers. The elevated temperatures and pressure actually cause the impregnated resins within the sheets to flow and thereby consolidate the layers into an integral mass.

For obvious economic reasons, it is common practice, when producing the paper supported laminates, to consolidate a plurality of these individual laminating assemblies into one large assembly, or press pack, said stacks being separated from one another by a release sheet, and then to laminate this pack by heat and pressure application.

In consolidating the laminate components according to most widely practiced techniques, an individual assembly is placed with its decorative overlayment surface adjacent to a highly polished stainless steel press plate. The function of the press plate is twofold. First, it provides a smooth, defect-free surface to one side of the laminate. Second, in connection with the paper based supported systems, it serves to separate pairs of back-to-back assemblies, thus permitting a plurality of these assemblies to be consolidated into laminates in one operation, usually in back-to-back relationship.

The heat and pressure consolidation of the laminate assemblies into useful laminates utilizing smooth, polished plates, results in the production of laminates having very glossy surfaces. When less glossy surfaces are required, an aluminum caul stock or a textured plate can be used to impart less glossy surfaces to the laminates.

As the decorative laminate art progressed, technicians continually strived to improve upon the aesthetics and properties of the high pressure and low pressure decorative laminates. One area where no significant developments have occurred is with regards to the mar-resistance of the laminate. Mar-resistance refers to the ability of the uppermost laminate surface to resist damage due to incidental or accidental contact thereof with an extraneous object. The propensity for laminate surfaces to exhibit poor mar-resistance is greater for laminates having high gloss surfaces than low gloss surfaces, especially where the decor sheet of the laminate is a solid color, and even more especially where the solid color is dark, e.g. navy blue, brown or black. Decorative laminates of this type show the "wear and tear" of everyday use more than laminates of a solid pastel color or laminates having a matte finish, regardless of which decorative pattern is employed.

Thus, there exists a need for increasing the mar-resistance of decorative laminates, the fulfillment of which would satisfy a long felt need in the art.

SUMMARY OF THE INVENTION

The present invention provides decorative laminates of increased mar-resistance by the incorporation of mineral particles into the uppermost surface of the laminate. The use of very small mineral particles in the production of abrasion resistant decorative laminates is well known, (see U.S. Pat. No. 3,525,664). However, this patent generally employs the use of much more of the mineral particles than used in the present invention and does not require that the particles be positioned in the outermost confines of the laminate surface. Additionally, known abrasion resistant laminates employ particles of a size much larger than useful herein. See U.S. Pat. Nos. 3,135,643; 3,445,327; 3,798,111; 4,263,081; 4,327,141; 4,305,987; 4,395,452; 4,255,480. It has been found that by following the teachings of the present invention, laminates having increased mar-resistance as opposed to increased abrasion-resistance can be produced.

DESCRIPTION OF THE INVENTION INCLUDING PREFERRED EMBODIMENTS

The present invention is directed to heat and pressure consolidated decorative laminates comprising, in superimposed relationship, (a) a self-supporting substrate, and (b) a thermoset resin impregnated decorative sheet, wherein the outermost surface of the laminate contains hard, mineral particles, said particles ranging in size from about 5 to about 100 millimicrons and being positioned within about the outmost 25 microns of said laminate thickness and in an amount ranging from about 0.5 to about 25 grams per square meter of laminate surface area. The laminates may contain an optional, thermoset resin impregnated, transparent overlay sheet positioned atop said decorative sheet.

As mentioned above, the self-supporting substrate may constitute any material known for this purpose with such materials of particleboard, chipboard, flakeboard, and the like being used in the production of low pressure laminates and resin impregnated kraft paper sheets (1–11 in number) being used in the production of high pressure laminates.

The decorative sheets are also well known, as mentioned above, and generally constitute alpha-cellulose containing, pigmented and/or printed paper sheets impregnated with a nobel thermoset resin such as melamine/formaldehyde resin, urea/formaldehyde resin, polyester resin and the like.

The optional overlay sheet, as discussed above, is equally well known and also comprises alpha-cellulose containing paper impregnated with a nobel thermoset resin such as melamine/formaldehyde resin or those listed above, and when formed into the laminate, is transparent, allowing the decorative pattern of the decor sheet to show through the laminate surface. These overlay sheets used in the practice of the present invention may contain abrasion resistant additives, such as hard particles of 20–50 micron size, to impart abrasion resistance to the laminate as is known in the art as represented by the above-mentioned patents.

The outermost surface of the laminates of the present invention i.e. immediately above the decor sheet in low pressure laminates or high pressure laminates devoid of an overlay sheet, or immediately above the overlay sheet, when used, in high pressure laminates, has positioned therewithin hard, mineral particles. These particles generally having a Mohs hardness of at least about 5, preferably at least about 9, are utilized in the form of a colloidal dispersion and range in size from about 5–100 millimicrons, preferably, from about 20–60 millimicrons. They end up in the laminate within the outermost 25 microns of the laminate thickness, preferably within the outermost 15 microns, and in an amount ranging from about 0.5 to about 25 grams per square meter of the laminate surface area, preferably from about 1 to about 10 grams per square meter. When lower concentrations of particulate material are employed, considerably less mar-resistance is imparted to the laminate and when higher concentrations are employed, the mar-resistance remains essentially constant, however, the laminates may exhibit graying and loss of gloss.

The mineral particles are incorporated into the laminate by spraying them, as a colloidal dispersion, onto the paper sheet which will form the outermost (uppermost) laminate component before said sheet is impregnated with resin, or after said sheet is impregnated with resin and before it is thereafter dried or, preferably, after said sheet is impregnated with resin and after it is thereafter dried.

Any particulate material conforming to the specifications specified above may be used, with such materials as silica, alumina, titanium oxide, tin oxide, zirconium oxide, antimony oxide, cerium oxide, diamond, alumina coated on silica, zirconia on silica, and the like, being exemplary.

When producing the novel laminates of the present invention, a thermosetting resin impregnated component sheet is formed containing the mineral particles in the manner and amount specified above. The resultant component sheet is positioned, with the mineral particle side facing outwardly, i.e. as the outermost (topmost) component of the decorative laminate assembly, and the assembly is heat and pressure consolidated as is known in the art.

The recovered laminate exhibits excellent mar-resistance attributable to the millimicron sized particles at the laminate surface. High gloss laminates retain their high gloss and matte or texturized laminates retain their same surface aesthetics as when the particles are absent. The laminates, however, when marred, retain a greater degree of their original surface gloss for a period longer than laminates devoid of the mineral particles.

The instant laminates may or may not be produced with the aid of extraneous binders such as microcrystalline cellulose, carboxy methyl cellulose, silane coupling agents, etc.

The incorporation of the mineral particles in accordance with the present invention does not significantly change or otherwise alter any of the necessary or desired performance properties of the laminates produced and, surprisingly, does not disadvantageously increase tool wear, an undesirable propery which usually accompanies the addition of hard particles to laminates.

The colloidal dispersion of the mineral particles can be applied to the laminate sheet by any suitable means such as by spraying, knife coating, roll coating, gravure coating, silk screening, Maier bar and the like.

The following examples are set forth for purposes of illustration only and are not to be construed as limitations on the present invention except as set forth in the appended claims. All parts and percentages are by weight unless otherwise specified.

In the following examples, there is a distinction made between mar-resistance and abrasion resistance. Mar-resistance is measured by the Mar-Resistance test specified below whereas abrasion resistance is measured using NEMA test LD 3–3.01. In the NEMA test, a laminate sample is clamped on a rotating disc, over which ride two weighted rubber wheels, faced with calibrated sandpaper strips. As the laminate surface is rotated under the wheels, the abrasive action of the sandpaper cuts through the surface of the laminate and gradually through the overlay until the printed pattern is exposed and destroyed. The NEMA standard for TYPE I laminate requires that the laminate, after four hundred rotation cycles, have no more than 50% of its pattern destroyed. The 50% end point is estimated by averaging the number of cycles at which the pattern shows initial wear, and the number of cycles at which the pattern is completely destroyed.

In the Mar-Resistance test, a first stratch mar is made on a first area of the test laminate surface with ten double-rubs using a fresh Scotch-Brite ® scour/pad (3M type 8A Standard Green Household-very fine cleaning and finishing containing $Al_2O_3$ as the abrasive) and a second scratch mar is made on a second area of the test laminate surface with another ten rubs using the same section of the previously used pad. Any dust created is removed, preferably with a paper towel moistened with water and dried. Following this procedure, a portable, digital readout 60° Gardner gloss meter as described in NEMA test LD 3–3.13(2.0) is calibrated in accordance with NEMA test LD 3–3.13 (4.0) and placed on the sample background. The maximum background gloss is recorded and the meter is moved slowly across the first scratch mar. The minimum gloss observed is recorded, the meter is moved to the next background area, the maximum background gloss is again recorded and the meter is finally moved over the second scratch mar where the minimum gloss is again recorded. The maximum background glosses are averaged, the minimum scratch mar glosses are averaged and the difference between the two averages is determined. The difference is then divided by the average background gloss. The result, times one hundred, is expressed as percentage loss of gloss. Fresh pads are used for each test (a test is two ten-double-rub marks on a given specimen). Test apparatus is AATCC Crockmeter Model CM-1, Atlas Electric Devices, Chicago, Ill., with 2 lb. load on 20 mm square pad.

In the following examples, various commercially available particulate mineral colloidal dispersions are used to impart mar-resistance to the surface of decorative laminates. The different dispersions used are identified and set forth below in Table I.

TABLE I

| Colloidal Dispersion | % Particulate Mineral* | pH | Av. Particle Size - mm | Specific Gravity | Dispersion Medium |
|---|---|---|---|---|---|
| A | 30 | 10.2 | 11–16 | 1.208 | $H_2O$ |
| B | 34 | 32 | 16–20 | 1.230 | " |
| C | 50 | 9.0 | 17–25 | 1.390 | " |
| D | 50 | 8.5 | 50–70 | 1.390 | " |
| E | 15 | 10.5 | 4 | 1.104 | " |
| F | 30 | 3.5 | 16–25 | 1.080 | $H_2O$/isopropanol |
| G | 40 | 9.7 | 15 | 1.296 | $H_2O$ |
| H | 14.5 | 9.0 | 5 | 1.092 | " |
| I | 40 | 9.2 | 20 | 1.292 | " |
| J | 35 | 4.0 | 16–22 | 1.180 | Eth. Cellosolve |
| K | 21[1] | 3.7 | 20 | 1.152 | $H_2O$ |
| L | 30[2] | 4.2 | 20 | 1.230 | " |
| M | 10[3] | 5.1 | 2 | 1.130 | " |

*$SiO_2$ except where otherwise indicated
[1] zirconia (2%) coated on silica (19%)
[2] alumina (4%) coated on silica (26%)
[3] alumina

EXAMPLES 1–15

Colloidal mineral dispersions, as described in Table I, are sprayed onto dry, melamine/formaldehyde resin impregnated solid navy blue decorative sheets. The sprayed sheets are dried to remove the dispersion medium, weighed and each individually are positioned atop six (6) sheets of phenol/formaldehyde resin impregnated, dry kraft paper sheets. The superimposed sheets are then heat and pressure consolidated into decorative laminates using polished stainless steel press plates. The resultant laminates are mar-resistance tested, as described above. The results are set forth in Table II, below. The polished steel plates are not scratched or otherwise affected at any gsm coating level used. A microscopic study, using X-Ray Emission Spectra, of the resultant laminates shows that all of the silica particles are contained within the outermost 15 microns of the laminate thickness.

TABLE II

| Example No. | Colloidal Dispersion | Particulate Coating-gsm | Gloss Loss % |
|---|---|---|---|
| 1 | B | 10 | 7.1 |
| 2 | B | 17.1 | 6.7 |
| 3 | C | 10 | 15.1 |
| 4 | H | 10 | 30.8 |
| 5 | E | 10 | 24.5 |
| 6 | A | 10 | 20.4 |
| 7 | G | 10 | 10.3 |
| 8 | I | 10 | 5.5 |
| 9 | J | 17.3 | 5.7 |
| 10 | K | 15.5 | 5.1 |
| 11 | F | 16.4 | 5.8 |
| 12 | B | 17.1 | 6.7 |
| 13 | B | 25.7 | 5.5 |
| 14 | B | 40.5 | 4.6 |
| 15 | B | 30 | 5.1 |
| Control | — | — | 61.7 |

As can be seen from Examples 14 and 15, when compared to Examples 1, 2, 12 and 13, an increase in the amount of added particles over an optimum maximum, does not materially alter the Gloss Loss achieved.

EXAMPLES 16–32

Following the procedure of Examples 1–15, above, except that the colloidal dispersions are gravure coated onto the resin impregnated, dry decor sheet, the mar-resistance test results set forth in Table III, below, are achieved. Again, the steel press plates are not materially affected and the particles are determined to be contained in the outermost 15 microns of the laminate thickness.

TABLE III

| Example No. | Colloidal Dispersion | Particulate Coating-gsm | Gloss Loss % |
|---|---|---|---|
| 16 | B | 19.5 | 15.3 |
| 17 | B | 19.5 | 17.4 |
| 18 | B | 16.3 | 9.8 |
| 19 | B | 9.6 | 27.7 |
| 20 | C | 10.0 | 31.1 |
| 21 | I | 9.0 | 39.2 |
| 22 | B | 22.1 | 13.3 |
| 23 | B | 15.7 | 24.3 |
| 24 | B | 11.2 | 44.8 |
| 25 | D | 14.0 | 49.1 |
| 26 | F | 15.3 | 5.0 |
| 27 | E | 7.0 | 53.6 |
| 28 | H | 7.4 | 37.9 |
| 29 | L | 16.7 | 38.9 |
| 30 | M | 4.0 | 44.7 |
| 31 | F | 13.7 | 16.4 |
| 32 | J | 26.1 | 31.3 |
| Control** | — | — | 61.7 |

**Ave. of 9 samples

EXAMPLES 33–43

Again the procedure of Examples 1–15 is followed, except that the colloidal dispersions are gravure coated onto the melamine resin impregnated, dry sheets and the press plates are etched with a suede finish. The mar-resistance test results are set forth in Table IV, below. No plate damage is discerned. Detection shows the particles to be in the upper 15 microns of the laminate thickness.

TABLE IV

| Example No. | Colloidal Dispersion | Particulate Coating-gsm | Gloss Loss % |
|---|---|---|---|
| 33 | B | 19.8 | —4.3* |
| 34 | B | 12.2 | —5.3 |
| 35 | B | 8.0 | 23.8 |
| 36 | B | 21.3 | 3.0 |
| 37 | A | 16.7 | 11.9 |
| 38 | C | 18.1 | 7.1 |
| 39 | D | 14.0 | 20.8 |
| 40 | A | 18.1 | 18.0 |
| 41 | A | 17.4 | 28.2 |
| 42 | B | 20.6 | 6.3 |
| 43 | B | 22.1 | 2.1 |

TABLE IV-continued

| Example No. | Colloidal Dispersion | Particulate Coating-gsm | Gloss Loss % |
|---|---|---|---|
| Control*** | — | — | 36.5 |

***Av. of 4 samples
*neg. value indicates polishing effect.

EXAMPLES 44-46

Colloidal mineral dispersions are gravure coated onto dry, melamine/formaldehyde impregnated, α-cellulose containing overlay sheets (containing about 25 micron diameter abrasive particles) and dried. The resultant sheets are individually positioned atop a dry, melamine/formaldehyde impregnated solid brown agate decor sheet which, in turn, is positioned atop five (5) phenolic resin impregnated kraft paper sheets. The assemblies are pressed into laminates having a high gloss surface. The laminates are examined and show the silica particles to be in the top 25 microns thereof. Examination of the stainless steel, polished press plates reveals no discernable damage. The mar-resistance test results recorded upon testing the laminate samples are set forth in Table V, below.

TABLE V

| Example No. | Colloidal Dispersion | Particulate Coating-gsm | Gloss Loss % |
|---|---|---|---|
| 44 | B | 9.5 | 8.7 |
| 45 | B | 9.5 | 6.2 |
| 46 | D | 4.8 | 16.1 |
| Control** | — | — | 39.0 |

**Av. of 2 samples

EXAMPLE 47

Colloidal Dispersion B is blended with microcrystalline cellulose and carboxy methyl cellulose. The resultant aqueous suspension contains 33% silica, 3.5% microcrystalline cellulose, 0.5% carboxymethyl cellulose and 63% water. The suspension is Maier Bar coated onto the dry, resin impregnated decor paper of Examples 1-15 and formed into a laminate as set forth therein. The percent Gloss Loss for the laminate as per the above mar-resistance test, which contains 26.4 gsm of silica, is 9.0.

EXAMPLE 48

The dry, resin impregnated decor paper of Examples 1-15 is coated with a 5% aqueous suspension of microcrystalline cellulose and carboxymethyl cellulose (7:1 ratio, respectively) using a Maier Bar and dried. A coating (4.6 gsm) of microcrystalline cellulose is then applied. The resultant sheet is next sprayed with Colloidal Dispersion B to deposit 22.7 gsm of silica. The percent Gloss Loss (determined using above described mar-resistance test) of the resultant laminate, formed as in Example 1-15, is 8.8.

EXAMPLE 49-51

Colloidal Dispersion F is blended with a commercially available dry melamine/formaldehyde resin to produce a suspension comprising 21.4% silica dioxide, 28.6% melamine resin, 28.6% isopropanol and 21.4% water. Following the procedure of Examples 1-15, this suspension is Maier Bar coated into three dry, melamine/formaldehyde resin impregnated Navy blue decor sheets and each is formed into a laminate. The mar-resistance test results are set forth in Table VI, below.

TABLE VI

| Example No. | Colloidal Dispersion | Particulate Coating-gsm | Gloss Loss % |
|---|---|---|---|
| 49 | F | 9.8 | 30.9 |
| 50 | F | 13.3 | 37.0 |
| 51 | F | 11.1 | 38.4 |

EXAMPLES 52-64

Following the procedure of Examples 1-15, Colloidal Dispersion B is spray coated onto a series of differently colored, dry, melamine/formaldehyde resin impregnated decor sheets and formed into laminates. No plate scratching or other marring can be seen. Examination show the silica particles to be within the top 20 microns of the laminates. The results of the mar-resistance test conducted on the laminates are set forth in Table VII, below.

TABLE VII

| Example No. | Decor Color | Particulate Coating-gsm | Gloss Loss % |
|---|---|---|---|
| 52 | Brown | 11.3 | 2.3 |
| 53 | Brown | 21.3 | 3.8 |
| Control | Brown | — | 52.7 |
| 54 | Coffee | 11.3 | 6.3 |
| 55 | Coffee | 24.9 | 4.6 |
| Control | Coffee | — | 67.4 |
| 56 | Black | 31.2 | 7.3 |
| 57 | Black | 17.2 | 8.5 |
| Control | Black | — | 63.2 |
| 58 | Burgundy | 17.1 | 10.0 |
| 59 | Burgundy | 26.2 | 9.6 |
| Control | Burgundy | — | 56.1 |
| 60 | Blue-Med. | 16.7 | 16.9 |
| 61 | Blue-Med. | 29.5 | 9.9 |
| Control | Blue-Med. | — | 67.9 |
| 62 | Green | 17.6 | 6.9 |
| 63 | Green | 23.8 | 5.2 |
| Control | Green | — | 44.0 |
| 64 | Blue-Dk | 30.0 | 8.0 |

EXAMPLES 65-67

In order to evaluate the effect of applying the particulate material to the topmost sheet at various stages of the resin impregnation and drying of said sheet, the decor paper of Examples 1-15 is impregnated with a commercially available melamine/formaldehyde resin to a resin content of 52% (on treated weight) and Colloidal Dispersion B is sprayed onto the paper at a 10 gsm level according to the following procedures and mar-resistance tested, after formation of the laminate, for Gloss Loss. The results are set forth in Table VIII, below.

TABLE VIII

| Example No. | Situs of Dispersion Application | Gloss Loss %[2] |
|---|---|---|
| 65 | Before resin application | 11.8 |
| 66 | After resin application but before drying | 13.6 |
| 67 | After resin application and after drying | 3.6 |
| Control[1] | — | 61.4 |

[1]No silica
[2]Av. of 10 laminates tested

EXAMPLE 68 (Comparative)

When the procedure of Examples 1–15 is again followed except that the particle size of the silica particles (in a water suspension) average 2–9 microns and the decor sheet is colored black, a Gloss Loss of 10% or lower is achieved when 4 or more gsm of the particles are sprayed on the decor paper. When more than 4 gsm are employed, the laminate surfaces exhibit a greying, however, at all gsm levels of silica, the highly polished plates of the laminate press show evidence of scratching.

EXAMPLES 69–71 (Comparative)

Following the procedure described in U.S. Pat. No. 3,525,644 (Sample G of Table II) a formulation is prepared from 200 parts of a commercially available melamine/formaldehyde resin, 240 parts of water, 10 parts of isopropanol and 160 parts of Colloidal Dispersion C. Navy blue decor paper is impregnated with the resultant formulation in accordance with said patent, formed into laminates which are tested in accordance with the mar-resistance and abrasion tests discussed above and compared to laminates void of any impregnated silica particles. The results are set forth in Table IX, below.

TABLE IX

| Example | Resin Impregnated % | Silica Content-gsm | Gloss Loss % | Abrasion Cycles to Failure | Abrasion Wear Rate g/100 Cycles |
|---|---|---|---|---|---|
| 69 | 38.5 | 37.2 | 50.7 | 813 | .0573 |
| 70 | 38.4 | 36.8 | 59.5 | 805 | .0589 |
| 71 | 38.2 | 36.4 | 57.8 | 855 | .0560 |
| Control* | 54.1 | — | 65.9 | 523 | .0738 |

*av. of 3 samples

As can be seen, the teachings of U.S. Pat. No. 3,525,644 result in the production of laminates exhibiting an increased abrasion resistance as disclosed therein, however, application of the silica particles to the decor sheet from an impregnating regin bath, does not materially increase the mar-resistance of the laminate produced therefrom even when high concentrations of silica are applied since the majority of the silica particles are not situated within the outermost 25 microns of the laminate thickness.

EXAMPLES 72–76

The procedure of Examples 1–15 is again followed except that brown decor paper is first conditioned to 50% RH, spray coated with Colloidal Dispersion F and reconditioned to 50% RH before being formed into a laminate. Various concentrations of silica particles are applied using this technique. The mar-resistance test results of these laminates are set forth below in Table X.

TABLE X

| Example No. | Particulate Coating-gsm | Gloss Loss % |
|---|---|---|
| 72 | 6.1 | 4.0 |
| 73 | 6.5 | 4.0 |
| 74 | 11.0 | 4.0 |
| 75 | 11.9 | 4.0 |
| 76 | 18.4 | 4.0 |
| Control | — | 75.1 |

EXAMPLES 77–82

Following the procedure of Examples 72–76 except that the decor sheet is black and Colloidal Dispersion B is used, the following mar-resistance test results are recorded. (Table XI).

TABLE XI

| Example No. | Particulate Coating-gsm | Gloss Loss % |
|---|---|---|
| 77 | 0.8 | 12.0 |
| 78 | 4.1 | 7.0 |
| 79 | 5.3 | 6.0 |
| 80 | 6.9 | 5.0 |
| 81 | 10.6 | 5.0 |
| 82 | 17.6 | 6.0 |
| Control | — | 65.0 |

EXAMPLES 83–87

Again following the procedure of Examples 72–76 except that Colloidal Dispersion C is used and the decor paper is black, the following mar-resistance test results are recorded. (Table XII).

TABLE XII

| Example No. | Particulate Coating-gsm | Gloss Loss % |
|---|---|---|
| 83 | 4.9 | 13.0 |
| 84 | 5.7 | 12.0 |
| 85 | 7.8 | 9.0 |
| 86 | 10.6 | 7.0 |
| 87 | 12.2 | 11.0 |
| Control | — | 69.1 |

EXAMPLES 88–93

The procedure of Examples 72–76 is again followed except that the decor sheet is black and Colloidal Dispersion I is used. Results are shown in Table XIII, below.

TABLE XIII

| Example No. | Particulate Coating-gsm | Gloss Loss % |
|---|---|---|
| 88 | 0.8 | 31.0 |
| 89 | 3.3 | 9.0 |
| 90 | 4.9 | 6.0 |
| 91 | 6.9 | 5.0 |
| 92 | 10.6 | 5.0 |
| 93 | 12.7 | 4.0 |
| Control | — | 63.2 |

EXAMPLE 94

The procedure of Examples 1–15 is again followed except that the phenolic resin core sheets are replaced by a ¾ inch thick, smooth surface particleboard. Similar Gloss Loss results are achieved.

EXAMPLES 95–100

A dry, α-cellulose containing solid white decorative sheet and a dry, α-cellulose containing woodgrain decorative sheet, each impregnated with about 56% (based on total weight) of a commercially available polyester resin, are coated with Colloidal Dispersion B to a pick-up of 3 gsm silica and dried. The resultant sheets are positioned atop 6 sheets of phenol/formaldehyde resin impregnated dry kraft paper sheets and heat and pressure consolidated into decorative laminates using polished steel plates or plates etched with a suede finish.

Uncoated control laminates are processed similarly. The results of the mar-resistance test are set forth in Table XIV, below. The silica particles are situated within the top 25 microns of the laminate thickness. No press plate damage is detected.

TABLE XIV

| Example | Laminate Surface | Gloss Loss % |
|---------|------------------|--------------|
| 95 | Woodgrain Coated Suede | 13.3 |
| 96 | Woodgrain Control Suede | 44.2 |
| 97 | White Coated Suede | 9.0 |
| 98 | White Control Suede | 22.6 |
| 99 | White Coated Polished | 12.9 |
| 100 | White Control Polished | 50.0 |

I claim:

1. A heat and pressure consolidated decorative laminate comprising, in superimposed relationship,
    (a) a self-supporting substrate, and
    (b) a thermoset resin impregnated decorative sheet,
the outermost surface of said laminate containing mineral particles, said particles ranging in size from about 5 to about 100 millimicrons and being positioned within about the outermost 25 microns of said laminate thickness and in an amount ranging from about 0.5 to about 25 grams per square meter of laminate surface area.

2. A decorative laminate according to claim 1 wherein said mineral is silica.

3. A decorative laminate according to claim 1 wherein said mineral is alumina.

4. A decorative laminate according to claim 1 wherein said mineral is alumina on silica.

5. A decorative laminate according to claim 1 wherein there is present, (c) a thermoset resin impregnated, transparent overlay sheet.

6. A decorative sheet according to claim 1 wherein the particle size of said mineral ranges from about 20 to about 60 millimicrons.

7. A decorative laminate according to claim 1 wherein said mineral particles are present in about the outermost 15 microns of the laminate thickness.

8. A decorative laminate according to claim 1 wherein the amount of mineral particles present in said laminate surface ranges from about 1 to 10 grams per square meter of laminate area.

9. A decorative laminate according to claim 1 wherein said (b) is polyester resin impregnated.

10. A decorative laminate according to claim 5 wherein (b) or (c) is impregnated with a melamine/formaldehyde resin.

11. A method for the preparation of a decorative laminate according to claim 1 which comprises:
    (a) forming a thermosetting resin impregnated component sheet containing mineral particles, said particles ranging in size from about 5 to 100 millimicrons and being present in an amount ranging from about 0.5 to about 25 grams per square meter of sheet surface
    (b) positioning said component sheet, with its particle surface upward, as the uppermost component of a decorative laminate assembly and
    (c) heat and pressure consolidating said assembly, whereby said particles are positioned within about the outermost 25 microns of the thickness of the resultant laminate.

12. A method according to claim 11 wherein said mineral is silica.

13. A method according to claim 11 wherein said mineral is alumina.

14. A method according to claim 11 wherein said mineral is alumina on silica.

15. A method according to claim 11 wherein said component sheet is a decorative sheet.

16. A method according to claim 11 wherein said component sheet is an overlay sheet.

17. A method according to claim 11 wherein the size of said mineral particles ranges from about 20 to about 60 millimicrons.

18. A method according to claim 11 wherein said mineral particles are positioned in about the outermost 15 microns of the laminate thickness.

19. A method according to claim 11 wherein the amount of mineral particles present in said component sheet surface ranges from about 1 to 10 grams per square meter of surface.

20. A method according to claim 11 wherein said component sheet is melamine/formaldehyde resin impregnated.

* * * * *